(12) United States Patent
Charpentier et al.

(10) Patent No.: US 8,125,962 B2
(45) Date of Patent: Feb. 28, 2012

(54) ANONYMOUS UPLINK MEASUREMENT REPORT IN A WIRELESS COMMUNICATION SYSTEM

(75) Inventors: Frederic Charpentier, Berlin (DE); Joachim Lohr, Darmstadt (DE); Dragan Petrovic, Darmstadt (DE)

(73) Assignee: Panasonic Corporation, Osaka (JP)

( * ) Notice: Subject to any disclaimer, the term of this patent is extended or adjusted under 35 U.S.C. 154(b) by 807 days.

(21) Appl. No.: 11/575,935

(22) PCT Filed: Sep. 22, 2005

(86) PCT No.: PCT/EP2005/010285
§ 371 (c)(1), (2), (4) Date: Oct. 4, 2007

(87) PCT Pub. No.: WO2006/034819
PCT Pub. Date: Apr. 6, 2006

(65) Prior Publication Data
US 2008/0056198 A1    Mar. 6, 2008

(30) Foreign Application Priority Data

Sep. 27, 2004  (EP) .................................. 04022975

(51) Int. Cl.
*H04W 4/00* (2009.01)
(52) U.S. Cl. ..................... 370/332; 370/252; 370/445
(58) Field of Classification Search ............... 370/252, 370/332, 445
See application file for complete search history.

(56) References Cited

U.S. PATENT DOCUMENTS

| | | | |
|---|---|---|---|
| 6,009,328 A * | 12/1999 | Muszynski | 455/442 |
| 7,177,658 B2 * | 2/2007 | Willenegger et al. | 455/522 |
| 7,296,205 B2 * | 11/2007 | Curcio et al. | 714/748 |
| 2003/0045281 A1 * | 3/2003 | Rimoni | 455/424 |
| 2003/0119452 A1 | 6/2003 | Kim et al. | |
| 2004/0008646 A1 | 1/2004 | Park et al. | |
| 2004/0151133 A1 * | 8/2004 | Yi et al. | 370/312 |
| 2005/0129058 A1 * | 6/2005 | Casaccia et al. | 370/464 |
| 2005/0282571 A1 * | 12/2005 | Oprescu-Surcobe et al. | 455/503 |

FOREIGN PATENT DOCUMENTS

| | | |
|---|---|---|
| EP | 1420551 | 5/2004 |
| EP | 1 530 307 | 5/2005 |
| JP | 2004-112428 | 4/2004 |

OTHER PUBLICATIONS

PCT International Search Report dated Dec. 14, 2005.
EP Search Report dated Feb. 28, 2005.
Japanese Office Action dated Feb. 15, 2011 with English Translation.

* cited by examiner

*Primary Examiner* — Jason Mattis
(74) *Attorney, Agent, or Firm* — Dickinson Wright PLLC

(57) ABSTRACT

In a mobile terminal of a wireless communication system, such as UMTS or any future communication system, the actual reception quality of data received on a broadcast channel, such as BCCH or MTCH, is measured. Based on the measurement result, a report is prepared and sent to a radio network controller, which controls the transmission on the broadcast channel. The report does not contain the identifier of the mobile terminal. Therefore the reporting can be accomplished without informing the radio network controller about the identity of the mobile terminal.

26 Claims, 8 Drawing Sheets

ANONYMOUS UPLINK MEASUREMENT REPORT IN A WIRELESS COMMUNICATION SYSTEM

This invention generally relates to wireless communication, and in particular to a control mechanism for the transmission quality of broadcast or multicast data in case of a wireless communication system. It applies in particular to MBMS (Multimedia Broadcast Multicast Service), which is a new UMTS feature currently standardised for the UMTS release 6 within 3GPP. However, the invention is not limited to MBMS but could be applied to any common channel broadcast in the downlink of a UMTS communication system or any other communication system including future mobile communication standards (4G).

In every communication system, the control of the quality of service (QoS) has always been a widely discussed topic. This is particularly true for wireless communication systems, where the interface between transmitter and receiver generally causes a more or less severe deformation of the physical signal leading to degradation of the received signal quality. In order to cope with this, several methods have been developed. Firstly, some modulation techniques have been specially developed in order to match the physical characteristic of the transmission medium. Secondly, encoding methods are used in order to protect the message from interference. Finally, QoS control mechanisms enable an active control of the reception quality of the transmitted signal. The main idea of this type of techniques is that the receiver informs, by some means, the transmitter about the reception quality in order to allow the transmitter to adapt the transmission characteristics (e.g. transmission power) and meet some predefined QoS attribute targets.

This invention belongs to the last category and provides a new measurement reporting type that can be used to adapt the characteristics of a transmitted service.

UMTS Air Interface Layers

In order to enable data transmission over a wireless interface, 3GPP defined a set of layers and their respective protocols, which have the goal to provide the necessary services to support the pre-defined QoS (data rate, error rate, priority etc) defined at the bearer setup.

As shown in FIG. 1, the radio interface is layered into three protocol layers:
  the physical layer (L1) 101;
  the data link layer (L2) 102;
  RRC layer (L3) 103.

Layer 2 is split into the following sub-layers: Medium Access Control (MAC) 104, Radio Link Control (RLC) 105, Packet Data Convergence Protocol (PDCP) 106 and Broadcast/Multicast Control (BMC) 107. Each layer has well defined functions, which are summarized in 3GPP TS 25.301v6.0.0 "Radio Interface Protocol Architecture".

The Layer 3 and RLC layer are divided into Control (C-) and User (U-) planes 108 and 109. PDCP 106 and BMC 107 exist in the U-plane 109 only. The main difference between control and user plane is that the control plane carries only control information (signalling) that is used by the peer entity in the receiver. The user plane on the other hand carries the data itself (e.g. voice).

The RLC layer 105 provides in the control plane 108 Signalling Radio Bearer (SRB) services and in the user plane 109 Radio Bearer (RB) services, except if the PDCP and BMC protocols are used. In this case RB services are provided by PDCP 106 or BMC 107.

The figure also shows connections 110 and 111 between RRC 103 and MAC 104 as well as between RRC 103 and L1 101 providing local inter-layer control services. Equivalent control interfaces 112 to 114 exist between RRC 103 and the RLC sub-layers 105, between RRC 103 and the PDCP sub-layers 106 and between RRC 103 and BMC sub-layers 107. These interfaces allow the RRC 103 to control the configuration of the lower layers within the same entity (transmission side or receiving side). Finally, the data transfer between the RLC 103 and the MAC sub-layer 104 is performed thanks to logical channels and by transport channels between the MAC 104 and the physical layer 101.

When information is to be transmitted from one layer to the one immediately below, SDU (Service Data Unit) and PDU (Protocol Data Unit) are exchanged as shown in FIG. 2, which depicts a configuration where the MAC layer 104 is transparent and the RLC layer 105 is not transparent. (A layer is said to be transparent when no action is performed on the data it received, i.e. no header addition, but the layer may perform segmentation/reassembly of the data packets.) Starting from the top of the picture, a higher layer PDU 201 is received by the RLC layer 105. In case of a transparent PDCP layer 106, this higher layer PDU is an IP packet. From the RLC point of view, this packet is an RLC SDU 202 that may need to be segmented in order to match the size of the RLC SDU segment 203 configured by RRC. The RLC protocol adds a header 204 to each RLC SDU segment 203, which has a content depending on the mode configured by the RRC layer. Each RLC SDU segment 203 with its header 204 forms a RLC PDU 205 that is given to the lower layer. This RLC PDU is, from a MAC layer 104 point of view, a MAC SDU 206. As in this example, the MAC protocol does not perform any action on the MAC SDU; it transforms it directly into a MAC PDU or transport block 207 and transmits it directly to the physical layer 101.

RLC Layer Transfer Modes

The RLC sub layer has three working modes or transfer mode: transparent mode, un-acknowledged mode and acknowledged mode (TM, UM and AM). The RLC sub layer is defined by 3GPP in 3GPP TS 25.322v6.1.0 "Radio Link Control (RLC) protocol specification", and a summary is given in 3GPP TS 25.301v6.0.0, cited above.

Transparent Data Transfer:

This service transmits upper layer PDUs without adding any protocol information but may perform segmentation/reassembly on the received PDUs. The transparent mode is mainly used for very delay-sensitive services like speech.

The following functions are needed to support transparent data transfer:
  Segmentation and reassembly.
  Transfer of user data.
  SDU discard.
  Unacknowledged data transfer:
  This service transmits upper layer PDUs without guaranteeing delivery to the peer entity.
  The unacknowledged data transfer mode has the following characteistics:
  Detection of erroneous data: The RLC sub-layer shall deliver only those SDUs to the receiving upper layer that are free of transmission errors by using the sequence number check function.
  Immediate delivery: The receiving RLC sub-layer entity shall deliver a SDU to the upper layer receiving entity as soon as it arrives at the receiver.
  The unacknowledged mode is used, for example, for certain RRC signalling messages. Examples of user services are the cell broadcast service (CBS), MBMS, voice over IP (VoIP) and potentially HSDPA.

The following functions are needed to support unacknowledged data transfer:
Segmentation and reassembly.
Concatenation.
Padding.
Transfer of user data.
Ciphering.
Sequence number check.
SDU discard.
Acknowledged Data Transfer:

This service transmits upper layer PDUs and guarantees delivery to the peer entity. In case RLC is unable to deliver the data correctly, the RLC at the transmitting side is notified. For this service, both in-sequence and out-of-sequence delivery are supported. In many cases an upper layer protocol can restore the order of its PDUs. As long as the out-of-sequence properties of the lower layer are known and controlled (i.e. the upper layer protocol will not immediately request retransmission of a missing PDU) allowing out-of-sequence delivery can save memory space in the receiving RLC.

The acknowledged data transfer mode has the following characteristics:
Error-free delivery: Error-free delivery is ensured by means of retransmission based on acknowledgment messages sent by the AM RLC entity at the receiver side. The receiving RLC entity delivers only error-free SDUs to the upper layer.
Unique delivery: The RLC sub-layer shall deliver each SDU only once to the receiving upper layer using duplication detection function.
In-sequence delivery: The RLC sub-layer shall provide support for in-order delivery of SDUs, i.e., RLC sub-layer should deliver SDUs to the receiving upper layer entity in the same order as the transmitting upper layer entity submits them to the RLC sub-layer.
Out-of-sequence delivery: Alternatively to in-sequence delivery, it shall also be possible to allow that the receiving RLC entity delivers SDUs to upper layer in different order than submitted to RLC sublayer at the transmitting side.

The following functions are needed to support acknowledged data transfer:
Segmentation and reassembly.
Concatenation.
Padding.
Transfer of user data.
Error correction.
In-sequence delivery of PDUs.
Duplicate detection.
Flow Control.
Protocol error detection and recovery.
Ciphering.
SDU discard.

QoS Control by the RLC Layer

The description of the different modes of the RLC layer has shown that actually only the RLC AM provides true QoS control mechanisms. Indeed, this is the only mode where the transmitter is informed of the correct reception of the RLC SDUs thanks to the acknowledgement messages. With these messages, the RLC AM entity at the transmitter side can compute the SDU error rate and compare it with the Qos attribute (SDU error rate) set at the RB setup procedure. However, it is also interesting to note that the RLC AM entity at the receiver side has no knowledge about the QoS attributes and in particular about the SDU error rate.

In the other modes, the SDU error rate QoS attribute has to be controlled by indirect means. One possibility is the usage of QoS functions of upper layer protocols (e.g. TCP/IP) but this solution is rather inefficient, as these protocols have not been developed specially for wireless systems. In UMTS, the QoS is usually controlled by other functions offered by lower layers like the power control function. This is particularly true for CS voice services where a TCP protocol cannot be used.

RRC States

The RRC states have been introduced in 3GPP specifications. They describe typical UE behaviours and requirements according to identified and classified scenarios and are specified in 3GPP TS 25.331v6.23.0 "Radio Resource Control (RRC); Protocol specification".

The following states are specified in 3GPP
Idle mode
Cell_PCH
URA_PCH
Cell_FACH
Cell_DCH The different RRC states and the possible transitions between them are shown in FIG. 3.

The most common RRC state is the idle mode 301, which occurs after power on. In this state, the UE only monitors the paging channel and waits for an incoming call. In the following, each state is shortly described.

CELL_DCH state 302:
The CELL_DCH state 302 is characterised by
A dedicated physical channel is allocated to the UE in the uplink and in the downlink.
The UE is known at cell level according to its current active set.
The CELL_DCH-state is entered from the Idle Mode through the setup of an RRC connection, or by establishing a dedicated physical channel from the CELL_FACH state.

CELL_FACH state 303:
The CELL_FACH state 303 is characterised by:
No dedicated physical channel is allocated to the UE.
The UE monitors a FACH channel in the downlink.
The UE is assigned a default common or shared transport channel in the uplink (e.g. RACH) that it can use anytime according to the access procedure for that transport channel.
The position of the UE is known by UTRAN at cell level according to the cell where the UE last made a cell update.

CELL_PCH state 304:
The CELL_PCH state 304 is characterised by:
No dedicated physical channel is allocated to the UE.
The UE monitors a PICH every DRX cycle in order to detect page sent by the CN.
The UE monitors the BCH in order to receive general system information
No uplink activity is possible.
The position of the UE is known by UTRAN at cell level according to the cell where the UE last made a cell update in CELL_FACH state.

URA_PCH state 305:
The URA_PCH state is characterised by:
No dedicated channel is allocated to the UE.
The UE monitors a PICH every DRX cycle in order to detect page sent by the CN.
The UE monitors the BCH in order to receive general system information.
No uplink activity is possible.
The location of the UE is known at the UTRAN Registration area level according to the URA assigned to the UE during the last URA update in CELL_FACH state.

Idle state 301:

The idle state 301 is characterised by:

No dedicated channel is allocated to the UE.

The radio access network has no knowledge about a UE in idle mode. It doesn't know its existence nor its location.

The UE monitors a PICH every DRX cycle in order to detect page sent by the CN.

The UE monitors the BCH in order to receive general system information.

No uplink activity is possible.

Common Downlink Channels in FDD

Several common downlink logical channels have been introduced in R99. All of them shall be broadcasted over the complete cell and all UEs in the cell should be able to receive them.

The BCCH (Broadcast Common Control Channel) contains general system information on the configuration of the system as well as configuration parameters for the UEs that selected this network. The BCCH is mapped onto the BCH transport channel. There is a one to one correspondence between BCCH and BCH.

The PCCH (Paging Control Channel) and the associated PICH (Paging Indicator Channel) are used to notify a UE about a incoming call (paging procedure). Note that the PICH is not a logical channel but a physical channel. Only the PCCH is a real DL common logical channel. The paging procedure is performed in 2 steps. First, a message is sent on the PICH that forces a group of UEs, including the paged UE, to read the PCH. The PCH itself contains more information such as the full Id of the paged UE and some details about the incoming call.

The PCCH is mapped onto the PCH transport channel. There is a one to one correspondence between PCCH and PCH.

The CTCH/CCCH (Common Traffic Channel and Common Control Channel) are used to transmit user and control information towards and from a population of UE. A typical example is CBS (cell broadcast service) or SMS where information on the cell (e.g. cell Id) or text message are broadcasted over the complete cell. CTCH and CCCH logical channels are mapped onto FACH (Forward Access Channel), which may also transmit dedicated logical channels such as DTCH or DCCH (Dedicated Traffic Channel and Dedicated Control Channel).

One common characteristic of all transport channels (FACH, PCH, BCH) carrying logical channels to be broadcast over the complete cell is that they are not power controlled and mechanisms have been defined to report the reception quality at the UE such as for example the transport channel BLER.

There is a need for a new reporting type which could be used to adapt the transmission parameters (transmission power, code rate) by collecting a significant number of such quality reports by the RNC for a particular cell.

Power Control of Dedicated Channel in FDD

A graphical description of the power control can be found in FIG. 4. In FDD, dedicated channels (DPCH) are power controlled in the uplink and in the downlink in order to compensate the fluctuations of the received power of dedicated channel due to fast and slow fading. After receiving from the CN 401 the parameters of the RAB to be established and in particular its QoS attributes (RAB ASSIGNMENT REQUEST message as defined in 3GPP TS 25.413v6.2.05.9.0 "UTRAN Iu interface RANAP signaling"), the RRC entity in the RNC 402 estimates the transport channel block error rate target (TRCH BLER target) for the DPCH that will carry the established RAB and signals this value to the peer RRC entity in the UE 403 during an RB setup procedure.

The TrCH BLER target is used as a reference value by the RRC entity in the UE 403 and, thanks to an implementation dependent function, computes the corresponding SIR_target of the physical channel carrying this transport channel. The UE 403 measures the SIR of the DL physical channel to be controlled 404 and compares the results of this measurement with the computed target value in order to generate the appropriate TPC command 405 (up or down) that is transmitted in the uplink. Finally a quality measurement report can be sent by the UE 403 to the network with a RRC MEASUREMENT REPORT in order to inform the RNC 402 on the achieved transport BLER.

Here again it can be noted that the UE is not informed about the actual value of the QoS attribute set by the CN 401. It further requires two mapping functions, which, if they occur to be inaccurate, may have a negative impact on the actual QoS experienced by the end user.

Summary of the Different Types of Reporting for QoS Support.

According to the previous sections and 3GPP TS 25.331v6.23.0 "Radio Resource Control (RRC); Protocol specification", 3 types of uplink signalling can be considered as supporting the QoS control in UMTS:

TPC commands are used by a UE in Cell_DCH in order to control the transmission power of a dedicated channel at the transmission side in order to match some predefined received power level.

ACK/NACK signalling are used by RLC UM in Cell_FACH or Cell_DCH mode in order to inform the transmitter RLC entity on the reception status of the RLC PDUs.

As mentioned in the previous section and as shown in section 14.5 of 3GPP TS 25.331v6.23.0, cited above, the only quality measurement report available in UMTS FDD is the transport channel BLER measurement. This can only be used in Cell_DCH mode.

The following conclusions on the different types of reporting for QoS support can be drawn.

Only UEs in cell_FACH and Cell_DCH are able to report in the uplink measurement reports.

Only UEs in Cell_DCH are able to report a quality measurement report.

UE Measurement reports are always associated in some way with the identification of the source UE. Indeed normal measurement report messages are sent over DCCH (dedicated control channel), which identifies the source UE and measurements on RACH are associated with a message that carries a UE identifier.

Multimedia Broadcast Multicast Service (MBMS)

One potential field of application for this invention is MBMS, which is a new 3G service currently under standardisation within the 3GPP standardisation body. In MBMS, a service (video clip, data download, etc.) is broadcasted over a predefined service area and is simultaneously received by one or many mobiles that previously subscribed to this service. An overview of the architecture and functional aspects of MBMS is given in 3GPP TS 23.246v6.32.0 "MBMS Architecture and functional description" and the radio aspects of MBMS are currently standardised in 3GPP TS 25.346v6.10.0 "Introduction of the Multimedia Broadcast Multicast Service (MBMS) in the Radio Access Network (RAN) stage 2". The main interest of MBMS is that the same information can be transmitted to several mobiles at the same time with a point to multipoint transmission PTM. Therefore the network does not need to set up dedicated links to each of the interested mobiles in order to transmit the data. Several new logical channels are currently standardised by 3GPP in order to introduce MBMS services into the UMTS system. The MTCH (MBMS Traffic Channel) is provided for carrying the MBMS service data content itself. If only a few UEs are interested in the broadcast service, the network may rely on a normal DPDCH physical channel after establishment of separate dedicated radio links (point-to-point transmission PTP) or on a S-CCPCH physical channel carrying a FACH transport channel in case of PTM transmission towards several UEs. Finally, a new logical control channel is introduced. The MCCH (MBMS Control Channel) broadcasts the current MBMS configuration and signals MBMS specific parameters or messages. Depending on the evolution of the standardisation process, more logical channels might be introduced in the future by 3GPP.

Soft and Selective Combining

In order to improve the reception quality at the UE, two techniques are currently under investigation in 3GPP. The general principle of soft and selective combining is the same. Both techniques rely on the reception of the same information from more than one cell. Soft combining is similar to the well-known soft handover scenario already introduced in R99 of UMTS, where a UE combines the soft bits received from several cells at the physical layer provided that the radio links from all cells are sufficiently synchronised in time. In the case of selective combining, the combining process takes place at the RLC layer. The principle of selective combining is shown in FIG. 5. With this technique, several links from several cells are received and each link undergoes an independent reception process up to the RLC layer. Therefore the RLC receives several times the same RLC PDUs that are identified by their sequence number (SN). As the different radio links are non-correlated, the probability of receiving correct RLC PDUs increases with the number of radio links. By selecting error-ree PDUs from different radio links and combining them, a data stream with lower PDU error rate or error ratio may be obtained.

A number of DL common channels (FACH, BCH, PCH) were introduced in 3GPP in the past. However there is no possibility to inform the transmitter on the reception quality (e.g. BLER, BER or other quality metric) of these channels. This is particularly true for UEs in idle, URA_PCH and Cell_PCH modes where no uplink exists. In these modes, the BCH and the PCH are monitored by the UE but a degraded reception quality cannot be signalled to the network.

As a matter of fact, in its current state, the transmission parameters (transmission power, code rate) for BCH, PCH and FACH are not based on the actual requirements and the needs of the receiving stations but there are some pre-defined parameters based on field measurements or on some empiric rules, as no quality feedback reports are sent from the terminals to the radio access network. Moreover it is currently not possible to test the UE reception performance of the BCCH and PCCH, as these UEs have no uplink. For FACH reception, some special test mode (loopback mode) can be used to overcome the absence of feedback reports. A UE in loopback mode transmits in the uplink the data received in the downlink. This allows the test equipment to compare the original signal with the received signal and to measure the UE reception performance.

At the beginning of the standardisation of UMTS, the lack of UL feedback for common channels was not regarded as a critical point that couldn't be addressed by turn-around solutions. Therefore no feedback mechanism was standardised. However with the introduction of MBMS the same issue reappears with a stronger dimension, as the MBMS traffic (e.g. MTCHs in case of PTM transmission, MCCH) will probably be carried by the FACH transport channel.

In the current state of the MBMS standardisation within 3GPP, no direct QoS control mechanism over the air interface has been developed except the point-to-point repair mechanism. However the point-to-point repair mechanism is an application level procedure, which cannot be used to control transmission parameters related to the radio access network (transmission power, code rate, etc). As a matter of fact, in its current state, MBMS relies on a "blind" transmission, where the transmission parameters are based not on the actual requirements and needs of the receiving stations but on some empiric rules, as no quality feedback reports are sent from the terminals to the radio access network.

This Gap in the Functionality in MBMS has Two Major Consequences.

First, no efficient adaptation of the transmission parameters of an MBMS session with respect to the actual terminal requirements is possible. In case of an insufficient transmission power, most of the UEs will receive the MBMS services with a high error rate and, if allowed by the application layer, will require a point-to-point repair session in order to recover the losses. This will create significant traffic in the uplink and in the downlink, which will severely decrease the spectrum efficiency of MBMS. Moreover as the point-to-point repair procedure is an application level procedure, this will be completely transparent to the UTRAN. It will see this traffic as signalling messages designated for the application layer. Therefore the UTRAN will not be able to use this procedure to adapt the radio parameters to the actual MBMS reception quality and will certainly use again the same parameters if an MBMS session with the same characteristics is to be transmitted.

Another major problem related to the lack of uplink feedback is the limitation in the testing of MBMS capable UEs. In 3GPP, all main functions have to conform to the specifications and shall be tested in order to guarantee a certain quality level. MBMS shall not be an exception to this rule, as new features will be introduced in the lower layers of the UE; reception of high data rate in RRC idle mode, URA_PCH and cell_PCH and cell_FACH modes, MCCH reception, selective combining, inter-frequency measurement in presence of MBMS to name a few. As MBMS reception should be provided in all RRC states and in particular in RRC idle mode, a methodology should be derived that would enable the conformance testing of MBMS in this mode. As mentioned above, UEs are usually tested with the help of a special loop back mode, where the DL traffic is directly sent back in the uplink to the test equipment that is simulating the UTRAN. This enables the test equipment to compare the received and processed signal with the original and to easily compute test metrics such as the transport channel BLER. The problem with MBMS in idle, cell_PCH, URA_PCH and also cell_FACH is that there is no uplink or only little bandwidth is available. Therefore it is impossible to carry the foreseen DL MBMS data rates (64 kbps to 256 kbps services) in the uplink. As a matter of fact, there is today no possibility to test MBMS UEs with the current version of the specifications.

In WO 2004/042963 A1, "An uplink common channel for sending feedback information" an uplink common channel is used for transmitting feedback information. However details of such a transmission are not specified.

US2003/0119452 A1 "Apparatus and method for controlling transmission power of downlink data channel in a mobile communication system supporting MBMS" proposes a feedback mechanism in order to control the QoS of an MBMS transmission. However in this application, the feedback reports are only composed of power commands that are based on an SIR measurement performed in the physical layer.

It is therefore an object of the present invention to solve both issues by proposing an efficient feedback mechanism that can be used by the radio access network to adapt the radio transmission parameters (transmission power, code rate, etc.) of the transport channel carrying R99 common logical channel (BCCH, PCCH, CCCH, CTCH) and the MBMS related logical channels (MTCH, MCIH) and to enable the testing of the BCCH and PCCH reception as well as testing a UE with respect to the new functionalities introduced by MBMS.

This object is achieved by a method according to an aspect of the present invention, a mobile terminal according to another aspect of the present invention, a radio network controller according to yet another aspect of the present invention and a test system according to still another aspect of the present invention. Advantageous embodiments are achieved according to various aspects of the present invention.

A new measurement reporting type in the uplink is disclosed where a UE receiving transport channels carrying common logical channels reports a kind of quality measurement metric to the network in an anonymous fashion. A new RRC procedure is proposed that may report the reception quality of a transport channel carrying a common logical channel. This RRC signalling called further herein below "RRC QUALITY REPORT".

This may provide UEs in idle mode receiving for instance BCCH, PCCH or MBMS a possibility to report valuable quality status information to the network or to a UE testing equipment without changing its RRC mode.

Such a new measurement reporting type has the following benefits in comparison to prior art:

Firstly, by introducing a feedback report on the reception quality of a common channel, it is possible for the RNC to adapt the transmission parameters of the considered logical channels (BCCH, PCCH, MBMS logical channels). If the RNC collects a significant amount of reports indicating within a specific cell an unacceptable reception quality, it might try to improve the situation by either increasing the transmission power of the associated physical channel, change the spreading factor of the physical channel, add more redundancy (decrease the code rate) of the transport channel or change the way the logical channel of interest (e.g. BCCH, PCCH) is multiplexed onto transport channels and physical channels. For instance, in case of PCCH it would be possible to map it exclusively onto a FACH transport channel that is exclusively mapped onto one S-CCPCH.

By omitting the terminal identifier in the report message, the traffic on the respective uplink channel is reduced. Hence by reducing the report message length, the uplink interference is also reduced.

In case of MBMS, the RNC could also vary the transmission power or the time offset of the MBMS service of interest in the neighbouring cell or initiate its transmission in order to improve the performance of soft or selective combining. Also in MBMS, the MBMS service has been associated with some QoS attributes and idle mode is expected to be the most typical RRC mode for UE receiving MBMS. With the introduction of an anonymous quality reporting in all RRC modes, the RNC can control the achieved QoS more accurately, as reports from idle mode UEs would be available.

This proposal enables also the testing of MBMS capable UEs in non Cell_DCH mode and the testing of demodulation performance of the BCCH or PCCH channels.

Although the invention is explained below for the example and with the terminology of a UMTS network, it should be understood that this is not limiting. The principle underlying the invention could equally be applied to wireless networks of other standards by replacing UMTS terms with appropriate equivalents.

In case of RRC idle mode, the UE has no connection to the network and is completely unknown to the network. Normally a UE in idle mode that wants to establish a connection with the network needs to perform first an RRC establishment connection request procedure and transits to Cell_FACH mode. A UE in connected mode (URA_PCH, Cell_PCH and Cell_FACH), on the other hand, needs to perform a cell update procedure as it has already a RRC connection with the RNC.

Figure 1:
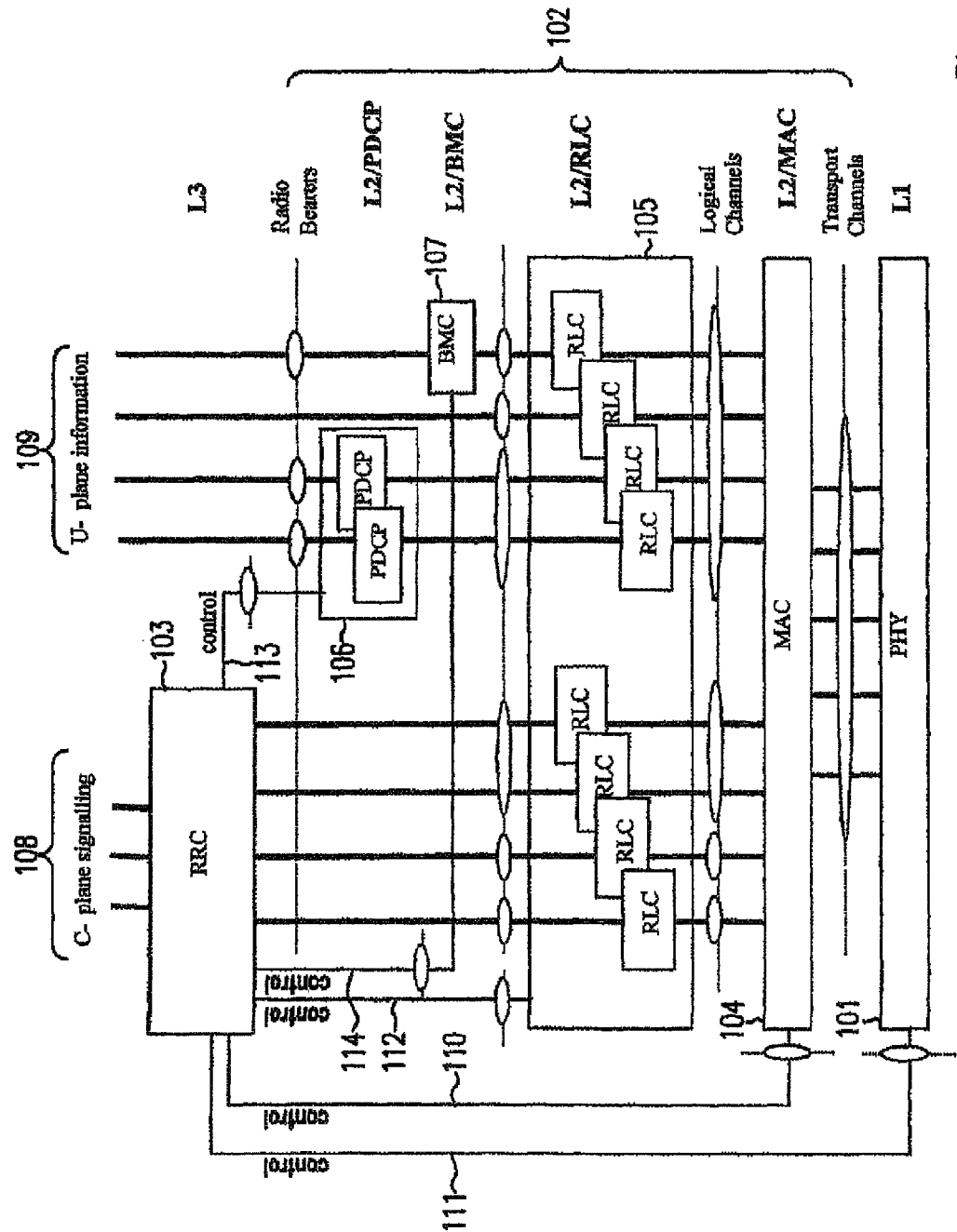
FIG. 1 shows an overview of UMTS Air Interface Layers.
Figure 2:
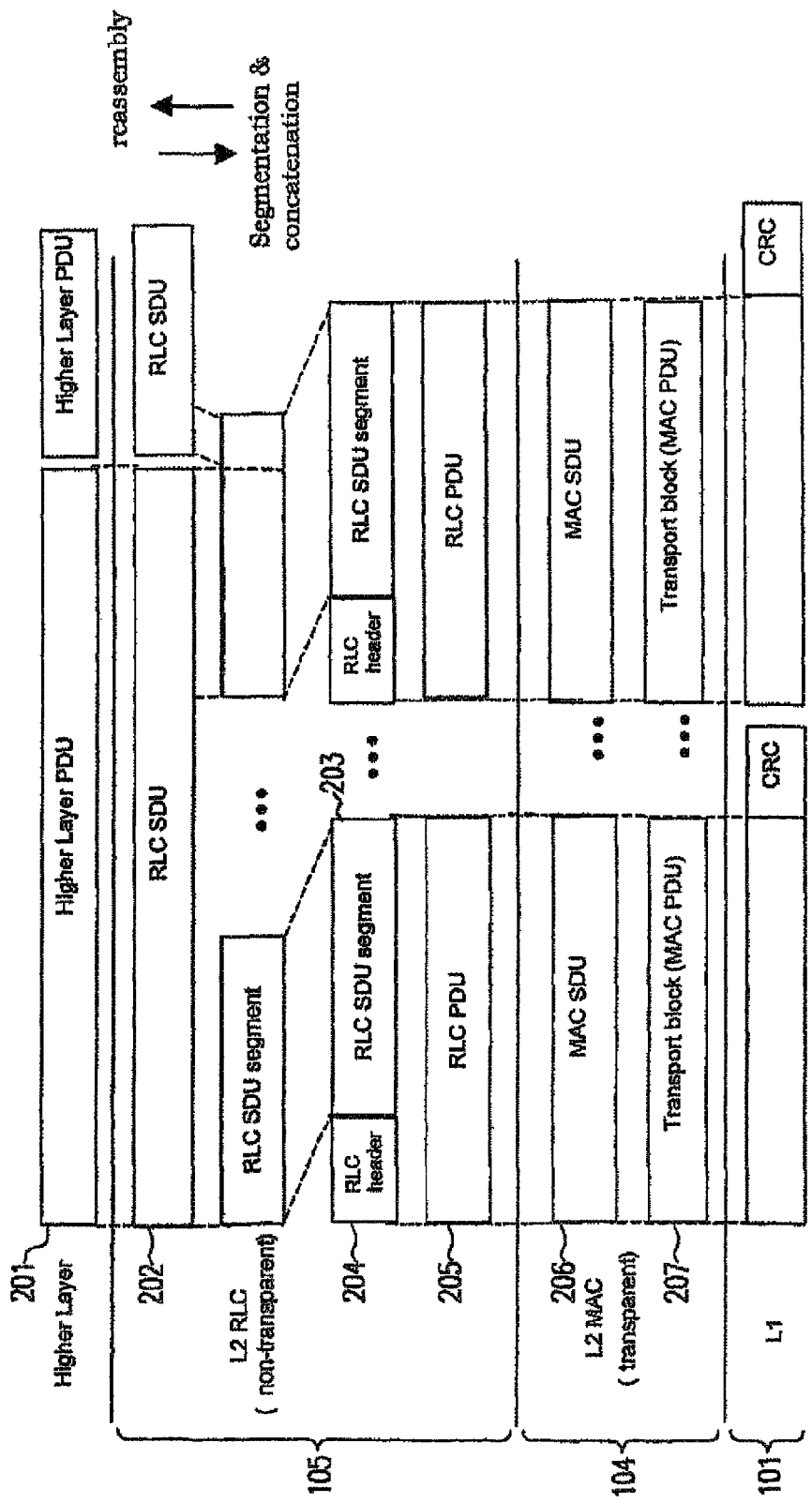
FIG. 2 depicts the Data transfer in a non-transparent RLC and a transparent MAC sub-layer.
Figure 3:
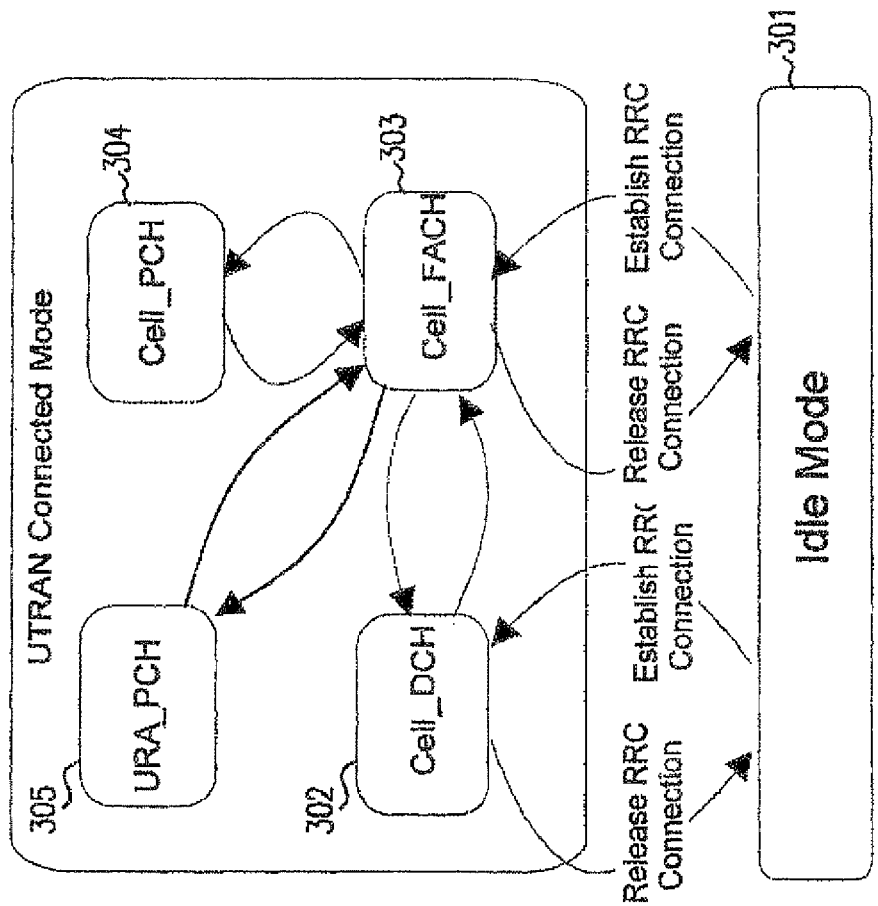
FIG. 3 illustrates RRC states and their transitions.
Figure 4:
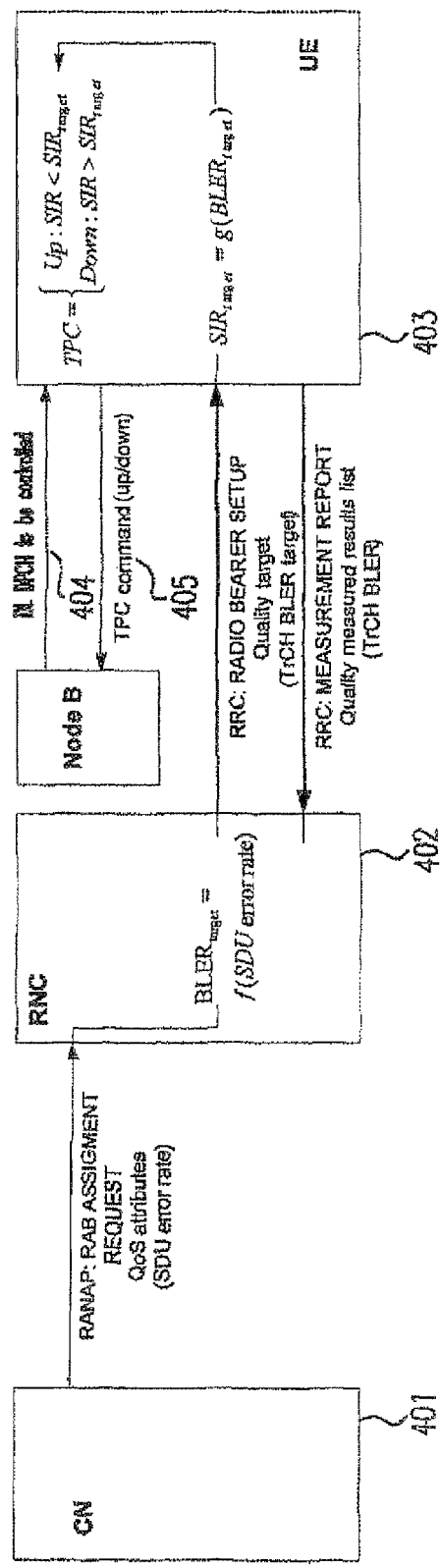
FIG. 4 depicts outer and inner loop downlink power control for FDD.
Figure 5:
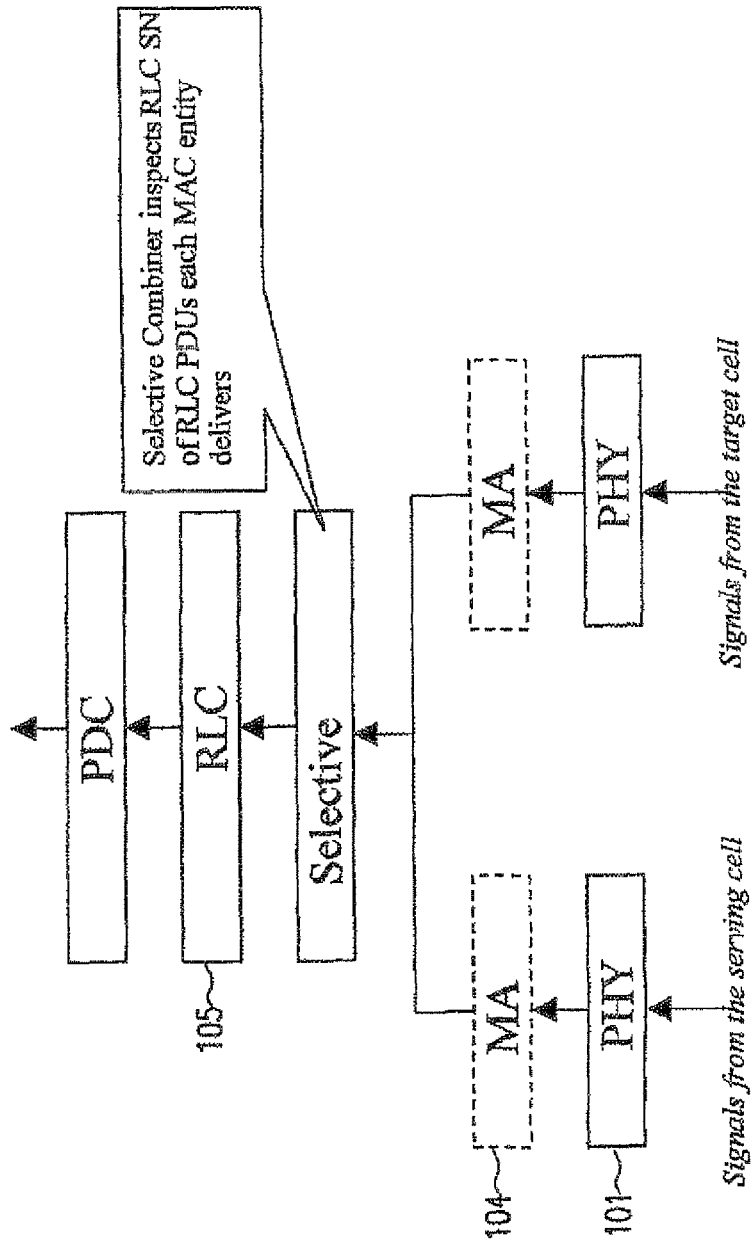
FIG. 5 illustrates the selective combining principle at the RLC layer.
Figure 6:
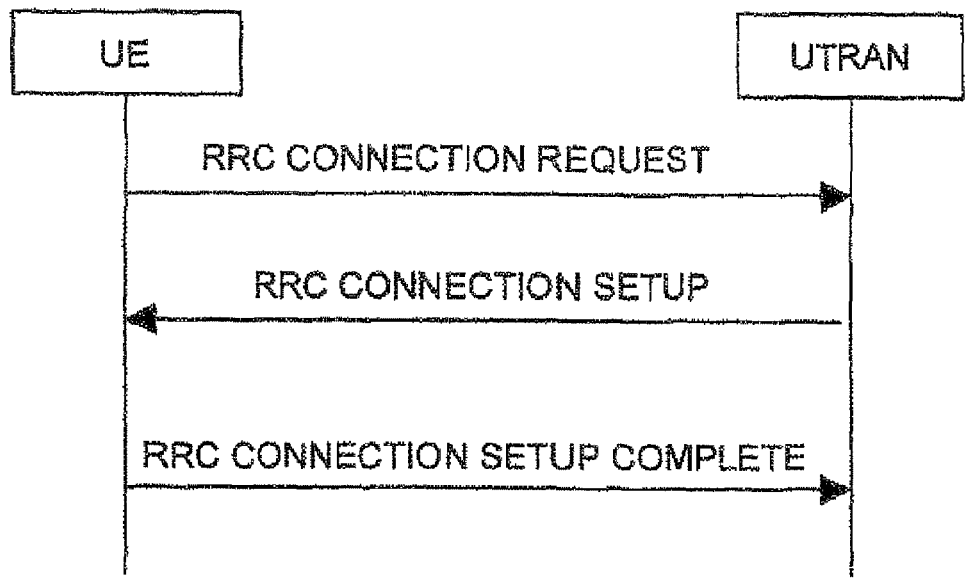
FIG. 6 illustrates a conventional RRC connection establishment procedure.
Figure 7:
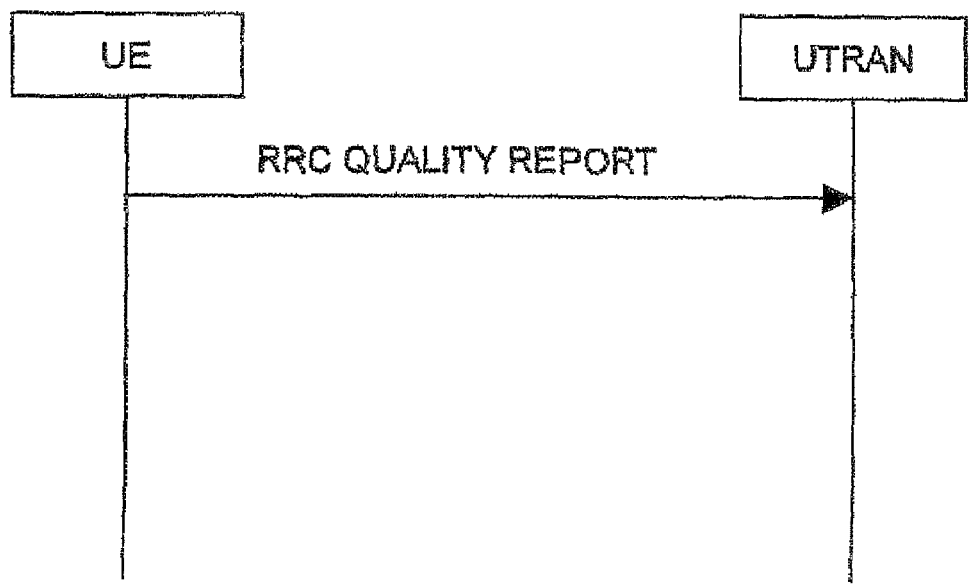
FIG. 7 depicts an anonymous quality measurement report procedure.

An RRC establishment procedure implies intensive signalling between the UE and the RNC over the wireless link as shown in FIG. 6 but also signalling exchanges between the RNC and the CN and also within the CN in order to prepare and set up the different radio bearers necessary to carry normal data or voice services. The situation is less critical with a cell update procedure for UE in connected mode since signalling exchanges occur between the UE and the RNC only if the registration and/or Location area (RA/LA) has changed or after the expiration of some internal timer (periodic cell update). However if the UE only wants to signal to the RNC a poor reception of the common logical channel (e.g. MBMS service), these procedures are not really efficient and lack adaptation to simple measurement reporting. Moreover this type of signalling should not have a high priority, and a network feedback (RRC connection setup) for the reception of the report is certainly not needed. Furthermore the RNC shouldn't be really interested in the actual identity of the UE that emits the quality report but more in the cell from which this report has been transmitted and the report statistics per cell. Instead of establishing an RRC uplink connection, the UE sends a specific message to the network on a Random Access Channel, RACH, similar to the RRC message "Measured results on RACH" (see section 10.3.7.45 of 3GPP TS 25.331v6.23.0, cited above), where the reception quality of the neighbouring cells is reported. Therefore the identity of the UE does not have to be transmitted to the RNC. Consequently the quality measurement report cannot be associated with the identity of the UE. This is also not necessary, as the quality of a broadcast signal is reported, and the RNC will react on a statistical evaluation of all received quality measurement reports associated with the same broadcast channel.

The RRC QUALITY REPORT should contain the identification of the corresponding DL channel PTM radio bearer that triggered the reporting (e.g. MBMS service Id or the transport/logical channel id), the value of the measured quality metric (e.g. transport channel BLER, transport channel BER, RLC SDU error rate as proposed in co-pending European Patent Application No. 1 641 189, etc.) and in case of MBMS, if some combining method has been used (soft combining or selective combining), the type of combining and some information on the reception quality of the cells that were considered by the combining method. For the last part of the message, the RRC message Measured results on RACH (see section 10.3.7.45 of 3GPP TS 25.331v6.23.0, cited above) could be re-used, in which the reception quality of the neighbouring cells is reported (CPICH RSCP, CPICH Ec/No or path loss). Compared with the current implementation of the RRC message Measured results on RACH, the reception quality of the cell the UE has selected should also be added. An information on the reception quality of the cells used for MBMS combining could be used by the network to decide which cell should be adapted, as it might be beneficial to increase the power of a neighbour cell and not the power of the cell the UE selected in case of soft and selective combining.

RNC 402 receives measurement reports from a plurality of UEs receiving the MBMS and can adjust transmission parameters of the respective broadcast channel, like transmission power, spreading factor, code rate or multiplexing parameters accordingly in order to secure the required transmission quality.

Although the RRC QUALITY REPORT could have a fixed configuration, it is advantageous to define a downlink broadcast RRC signalling that configures this report together with the related measurement similar to the RRC MEASUREMENT CONTROL message (see section 8.4.1 and 10.2.17 in 3GPP TS 25.331v6.23.0, cited above). Furthermore this RRC message should be associated with a specific broadcast channel and broadcast to all UEs potentially receiving this channel. The message can be either broadcast over BCCH, over CCCH or over MCCH.

Possible elements of this RRC QUALITY MEASUREMENT CONTROL message could be
  broadcast channel, MBMS service or MBMS PTM RAB identification
  configuration information regarding the type of measurement to be reported on and concerning related parameters or
  a reporting period (for periodic measurement and reporting, see below) or a threshold (for event-triggered measurement and reporting, see also below).

The measurement control message could also comprise information from which a transmission time of the quality measurement report is derived by the UEs. In this case the exact instance of time would have to be individually randomized by the UEs within a certain interval in order to avoid conflicts in the uplink resources.

As the main constraints in a mobile communication system concern air capacity and UE battery power, the RRC QUALITY REPORT should only be transmitted when necessary.

Although the measurement report could be configured for periodic transmission, it is advantageous to configure in the RRC a so-called event-triggered measurement and/or reporting. With an event-triggered measurement, the UE sends the RRC QUALITY REPORT only if the measured value exceeds or falls below a specific threshold (Q_threshold), whereas with a periodic measurement, the UE reports the measurement results periodically. In case of high uplink interference or for other reason, this quality reporting could be disabled by either setting Q_threshold to an infinite value or by not broadcasting the measurement configuration message. In another embodiment, it may be defined that a report is sent when the measured SDU error rate exceeds or falls below the threshold by a pre-defined margin. This provides an additional parameter for a trade-off between efficient use of transmission capacity and transmission reliability.

Periodical reporting could for example be used if the UE already has a connection to the network for some other purpose and can use it to piggyback this measurement report.

In another advantageous embodiment, an activation command is introduced. The network uses the activation command to request the reporting of the quality measurement that has previously been configured but not activated. This reporting mode could be applied to either an event-triggered measurement or a periodic measurement. It is also possible to de-activate the reporting later by sending a respective command, which might be the activation command with a respective flag reset. Such an activation command could be broadcast over the same channels as the configuration command.

In another advantageous embodiment of the invention the actual value of the quality report in the RRC QUALITY REPORT message is omitted. Indeed, in case of event-triggered measurement, the presence of the RRC QUALITY REPORT message already informs the UTRAN on the reception quality of the associated DL channel at the UE, for example that such a reception quality is insufficient.

Another possible variant is to reuse completely the RRC CONNECTION REQUEST message and to only append the quality report. Moreover in order to prevent further useless signalling, a special cause for the RRC connection request could be added in order to differentiate a normal RRC connection request used for the establishment of a normal voice call and an RRC connection request for common channel quality reporting. Following the same lines, the CELL update message could also be modified in order to permit UEs in RRC connected mode (except cell_DCH) to report the same information.

Another variant is to reuse the same message for UE in connected mode. In this case the identification of the UE is provided by the dedicated channel used to carry this information (DCCH).

Finally a UE in CELL_DCH (DCH channels exists in DL and UL) could use the already dedicated connection to send measurement reports to the RNC. In this case it might be interesting to reconfigure the measurement and select a periodic measurement in order to give to the network even more accurate information on the reception quality.

Figure 8:
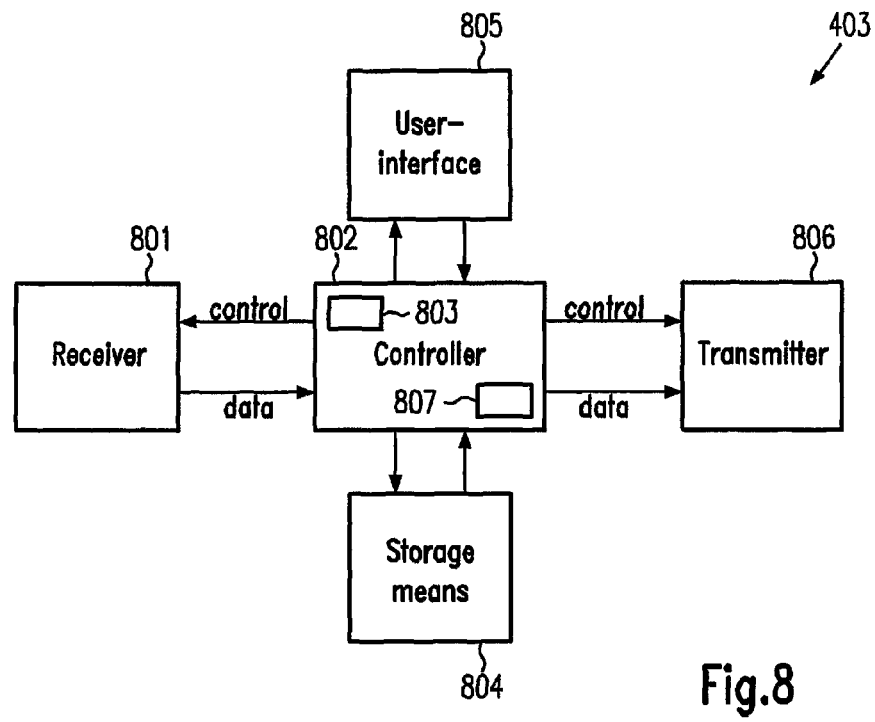
FIG. 8 shows a schematic of a mobile terminal (UE) to which the method according to the invention can be applied.

FIG. 8 illustrates the structure of a mobile terminal (UE) 403. A mobile terminal may be a conventional mobile phone, a smart phone, or a respective module in any acoustic, video or data processing device. It might even be a module mounted on a vehicle and connected to a processor therein. It comprises a receiver 801 and a controller 802. It may further comprise a transmitter 806, a user interface 805 including display, keys and acoustic devices and storage means 804 for storing executable instructions for the controller 803 as well as any other data. Controller or Controlling means 802 may comprise one or more processors for protocol interaction, signal processing and control of other components. In order to execute the method according to the present invention, controller 802 further comprises determining means 803 for determining a value associated with an actual reception quality of a received common channel and reporting means 807 which control the transmitter in a way that it transmits a report on this determined value. In accordance with the method described above, the reporting means 807 will prepare and send the report in a way that it cannot be associated with the terminal which is sending it. The determining means and reporting means could be implemented in hardware logic, but will in most cases be implemented in instructions which perform this task when they are executed on a processor of controlling means 802. In an advantageous embodiment, controlling means 802 may further be configured to receive a configuration message from a RNC comprising information about the configuration of the value to be determined and about the report. Such configuration information may specify a measurement or statistical evaluation to be performed in determining the value, information about which data should be comprised in the report, and in which format, and information about when the reports should be transmitted.

Such instructions can be stored in a non-volatile part of storage means 804, for example read only memory (ROM), programmable read only memory (PROM), EPROM, EEPROM or FLASH. The instructions may be loaded to such semiconductor storage media from other computer-readable storage media like magnetic disk, magnetic tape or optical disk.

Figure 9:
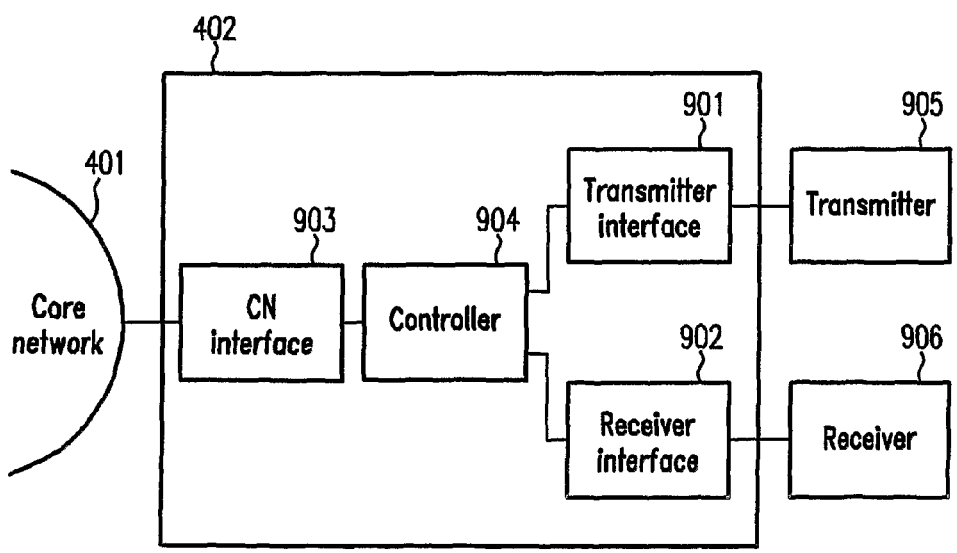
FIG. 9 illustrates a schematic of a RNC which can serve as a counterpart for the mobile terminal shown in FIG. 8.

FIG. 9 illustrates a RNC 402 which could act as a counterpart to UE 403. It comprises a transmitter interface 901 to connect it to a transmitter 905, a receiver interface 902 to connect it to a receiver 906, a core network interface 903 to connect it to a CN 401 and controlling means or a controller 904 which controls the interfaces and performs protocol tasks and signal processing. Controller 904 is configured, by special hardware or by instructions executed on a processor, to transmit broadcast or multicast data like BCCH data or MBMS data via transmitter interface 901 and transmitter 905. Controller 904 further generates a measurement control message as described further above and arranges for its broadcasting via transmitter interface 901 and transmitter 905. It receives quality measurement reports from UEs via receiver 906 and receiver interface 902 and adjusts transmission parameters of the specific common channel accordingly in order to provide the necessary transmission quality. In the case of MBMS, the target transmission quality is specified in the information received from CN 401 via core network interface 903.

Figure 10:
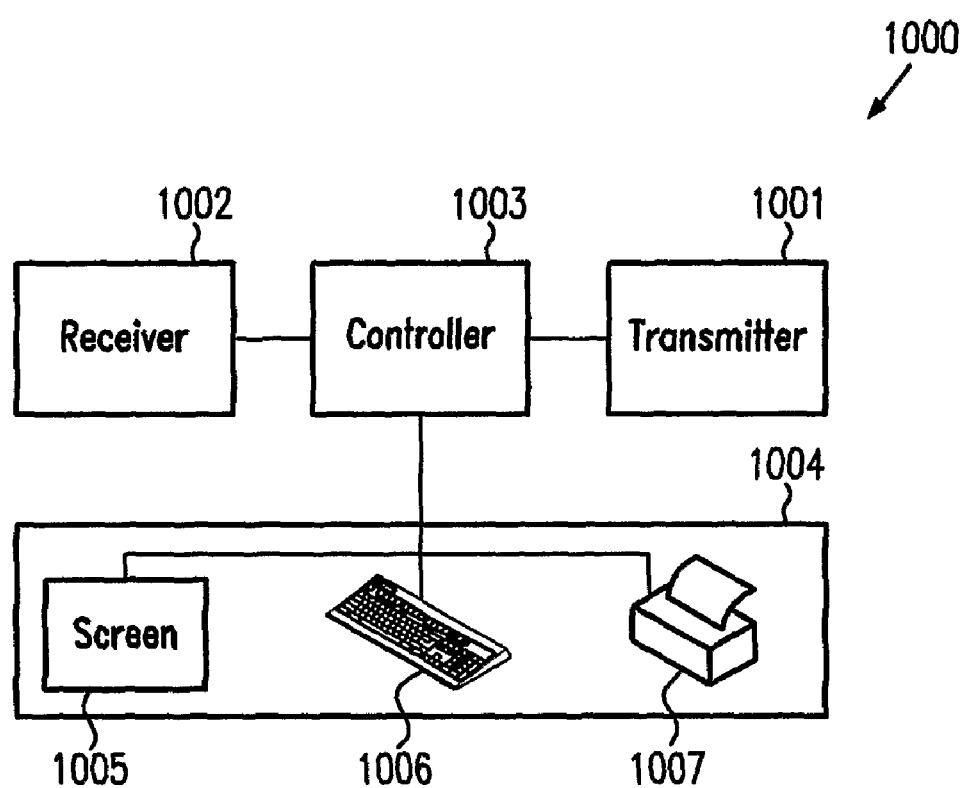
FIG. 10 depicts a schematic of a test system which can be used to test a mobile terminal as shown in FIG. 8.

FIG. 10 illustrates a test system 1000 for testing MBMS related functionality of UEs. It comprises a transmitter 1001, a receiver 1002, a controller or controlling means 1003 and user interface 1004 comprising for example a LCD or CRT screen 1005, a keyboard 1006 and a printer 1007. Test system 1000 behaves more or less like a RAN comprising RNC 402 described in the section above. However, contrary to the functionality of the RNC as described above, tester 1000 does not adjust transmission parameters for the MBMS based on the measurement reports from the UE under test. Instead it prepares a test report about the UE, based on the information comprised in the received measurement reports and outputs the test report via user interface 1004. To this end it also may vary systematically various kinds of transmission parameters, add noise or simulate propagation effects like fading in order to test the behaviour of the UE under these conditions.

APPENDIX

Abbreviations

| Abbreviation | Description |
| --- | --- |
| 3GPP | 3rd Generation Partnership Project |
| AM | Acknowledged Mode |
| BCCH | Broadcast Control Channel |
| BCH | Broadcast Channel |
| BLER | Block Error Ratio |

APPENDIX-continued

Abbreviations

| Abbreviation | Description |
| --- | --- |
| BMC | Broadcast/Multicast Control |
| BM-SC | Broadcast-Multicast Service Centre |
| CBS | Cell Broadcast Service |
| CCCH | Common Control Channel |
| CN | Core Network |
| CS | Circuit Switched |
| DCCH | Dedicated Control Channel |
| DCH | Dedicated Channel |
| DL | Downlink |
| DPCH | Dedicated Physical Channel |
| DPDCH | Dedicated Physical Data Channel |
| DRX | Discontinuous Reception |
| FACH | Forward Access Channel |
| FDD | Frequency Division Duplex |
| HSDPA | High Speed Downlink Packet Access |
| IE | Information Element |
| LA | Location Area |
| MAC | Medium Access Control |
| MBMS | Multimedia Broadcast Multicast Service |
| MCCH | MBMS Control Channel |
| MTCH | MBMS Traffic Channel |
| PCH | Paging Channel |
| PDCP | Packet Data Convergence Protocol |
| PDU | Protocol Data Unit |
| PICH | Page Indicator Channel |
| PTM | point-to-multipoint transmission |
| PTP | point-to-point transmission |
| QoS | Quality of Service |
| RA | Registration Area |
| RAB | Radio Access Bearer |
| RACH | Random Access Channel |
| RAN | Radio Access Network |
| RANAP | Radio Access Network Application Part |
| RB | Radio Bearer |
| RLC | Radio Link Control |
| RNC | Radio Network Controller |
| RRC | Radio Resource Control |
| S-CCPCH | Secondary Common Control Physical Channel |
| SDU | Service Data Unit |
| SIR | Signal-to-Interference Ratio |
| SN | Sequence Number |
| SRB | Signalling Radio Bearer |
| TCP | Transmission Control Protocol |
| TM | Transparent Mode |
| TPC | Transmission Power Control |
| TrCH | Transport Channel |
| TTI | Transmission Timing Interval |
| UE | User Equipment |
| UM | Un-acknowledged Mode |
| UMTS | Universal Mobile Telecommunications System |
| URA | User Registration Area, UTRAN Registration Area |
| UTRAN | Universal Terrestrial Radio Access Network |
| VoIP | Voice over Internet Protocol |

The invention claimed is:

1. A method for controlling the reception quality of broadcast or multicast data in a mobile terminal of a wireless communication system, comprising:
   a) receiving said data via a transport channel of the wireless communication system;
   b) determining a value associated with an actual reception quality of said received data; and
   c) sending a report related to said determined value to an entity controlling said transport channel,
   wherein said report is an anonymous report not including an identity of the mobile terminal and is sent via a random access channel so that said entity cannot associate the report with the mobile terminal, wherein said report is transmitted without the mobile terminal being logically connected to said wireless communication system, and wherein the determined value associated with the actual reception quality of said received data is omitted from said report.

2. The method according to claim 1, wherein said report comprises information about an identity of said transport channel.

3. The method according to claim 1, wherein said transport channel is a forward access channel, a paging channel or a broadcast channel.

4. The method according to claim 3, wherein said data is associated with a certain multimedia broadcast multicast service, and said report comprises information about an identity of said multimedia broadcast multicast service.

5. The method according to claim 1, wherein said report comprises information whether said value exceeds or falls below a defined threshold.

6. The method according to claim 1, further comprising, before the receiving of said data, receiving a message comprising configuration information concerning at least one of said determining of said value and said sending of said report.

7. The method according to claim 6, wherein said message is received from a broadcast control channel or from a multimedia broadcast multicast service control channel.

8. The method according to claim 6, wherein said report is sent in response to said message.

9. The method according to claim 6, wherein said report is sent at a time derived from information comprised in said message.

10. The method according to claim 1, wherein said report is sent periodically.

11. The method according to claim 1, wherein said report is sent when said value exceeds or falls below a pre-defined threshold.

12. The method according to claim 5, wherein said threshold is derived from a quality of service attribute associated with said data.

13. The method according to claim 12, wherein said threshold is equal to said quality of service attribute associated with said data.

14. The method according to claim 12, wherein said threshold is below or above said quality of service attribute by a pre-defined margin.

15. The method according to claim 1, further comprising, before said determining of said value,
   d) receiving said broadcast or multicast data via at least one more wireless link of the wireless communication system; and
   e) combining data received via different wireless links and carrying the same information.

16. The method of claim 15, wherein said report further comprises information about a type of said combining.

17. The method according to claim 15, wherein said report comprises information cells considered for said combining.

18. The method according to claim 15, wherein said report comprises information on a reception quality of one or more cells considered for said combining.

19. A non-transitory computer-readable storage medium, having stored thereon instructions, which, when executed on a processor of a mobile terminal, cause the mobile terminal to perform the method according to claim 1.

20. The method according to claim 16, wherein said report comprises information on a reception quality of one or more cells considered for said combining.

21. The method according to claim 17, wherein said report comprises information on a reception quality of one or more cells considered for said combining.

22. A mobile terminal for use in a wireless communication system, comprising:
   a receiver to receive data via a transport channel of said wireless communication system;
   a transmitter to send data via said wireless communication system; and
   a controlling unit configured to control said receiver and said transmitter,
   said controlling unit further comprising a determining unit configured to determine a value associated with an actual reception quality of said received data and a reporting unit configured to control said transmitter to transmit a report about said determined value to an entity controlling said transport channel,
   wherein said reporting unit is further configured to prepare and send said report via a random access channel, wherein the report does not include an identity of the mobile terminal and is sent via the random access channel so that the report cannot be associated with the mobile terminal,
   wherein said reporting unit is further configured to cause said transmitter to transmit said report without being logically connected to said entity controlling said transport channel, and
   wherein the determined value associated with the actual reception quality of said received data is omitted from said report.

23. A wireless communication system comprising:
   at least one mobile terminal according to claim 22; and
   a radio network controller, for use in a wireless communication system, said radio network controller comprising:
   a transmitter interface to connect to at least one transmitter;
   a receiver interface to connect to at least one receiver;
   a core network interface to connect to a core network of said wireless communication system; and
   a controlling unit to control said interfaces, said transmitter and said receiver, said radio network controller being further configured:
   to transmit broadcast or multicast data in a transport channel of said wireless communication system via said transmitter,
   to transmit a message via said transmitter, the message comprising configuration information concerning the generation of measurement reports based on an actual reception quality of said data and/or concerning transmission of said measurement reports;
   to receive said measurement reports from a mobile terminal via said receiver; and
   to configure transmission parameters for the transmission of said data depending on information comprised within said measurement reports,
   wherein said measurement reports do not include an identity of the respective mobile terminal sending the respective measurement report and the receiver receives the measurement reports via a random access channel so that the measurement reports cannot be associated with the mobile terminals by said radio network controller, wherein said measurements reports are transmitted without the mobile terminal being logically connected to said wireless communication system, and wherein said measurement reports do not include a value determined by the mobile terminal which is associated with the actual reception quality of the transmitted broadcast or multicast data.

24. A radio network controller, for use in a wireless communication system, comprising:
   a transmitter interface to connect to at least one transmitter;
   a receiver interface to connect to at least one receiver;
   a core network interface to connect to a core network of said wireless communication system; and a controlling unit to control said interfaces, said transmitter and said receiver, said radio network controller being further configured:

to transmit broadcast or multicast data in a transport channel of said wireless communication system via said transmitter, to transmit a message via said transmitter, the message comprising configuration information concerning the generation of measurement reports based on an actual reception quality of said data or concerning transmission of said measurement reports;

to receive said measurement reports from a mobile terminal via said receiver; and to configure transmission parameters for the transmission of said data depending on information comprised within said measurement reports, wherein said measurement reports do not include an identity of the respective mobile terminal sending the respective measurement report and the receiver receives the measurement reports via a random access channel so that the measurement reports cannot be associated with the mobile terminals by said radio network controller, and wherein said measurement reports are transmitted without the mobile terminal being logically connected to said wireless communication system, and wherein said measurement reports do not include a value determined by the mobile terminal which is associated with the actual reception quality of the transmitted broadcast or multicast data.

25. The radio network controller according to claim 24, wherein said transmission parameters comprise a transmission power, a spreading factor, a code rate or multiplexing parameters.

26. A test system for the test of a mobile terminal, comprising:

a transmitter to send data to said mobile terminal;

a receiver to receive data from said mobile terminal;

a controlling unit configured to control said receiver and said transmitter; and a user interface to control functions of the test system and to output test results, said controlling unit being further configured:

to transmit broadcast or multicast data in a wireless communication system via said transmitter;

to transmit a message via said transmitter, the message comprising configuration information concerning the generation of measurement reports based on an actual reception quality of said data and/or concerning transmission of said measurement reports;

to receive said measurement reports from said mobile terminal; and to output a test report via said user interface, based on information comprised within said measurement reports, wherein said measurement reports do not include an identity of the respective mobile terminal sending the respective measurement report and the receiver receives the measurement reports via a random access channel so that the measurement reports cannot be associated with the mobile terminals by said test system, wherein said measurements reports are transmitted without the mobile terminal being logically connected to said wireless communication system, and wherein said measurement reports do not include a value determined by the mobile terminal which is associated with the actual reception quality of the transmitted broadcast or multicast data.

* * * * *